United States Patent [19]

Findlan

[11] Patent Number: 5,215,243

[45] Date of Patent: Jun. 1, 1993

[54] HOT ISOSTATIC BONDING PROCESS FOR REPAIRING SHAFTS

[75] Inventor: Shane J. Findlan, Concord, N.C.

[73] Assignee: Electric Power Research Institute, Inc., Palo Alto, Calif.

[21] Appl. No.: 576,077

[22] Filed: Aug. 31, 1990

[51] Int. Cl.$^5$ .................... B23K 31/00; B23P 6/00
[52] U.S. Cl. .................... 228/119; 228/186; 29/402.13
[58] Field of Search ............... 228/119, 125, 186, 168, 228/169, 237, 243, 175, 263.15; 29/402.13, 402.18

[56] References Cited

U.S. PATENT DOCUMENTS

| | | | |
|---|---|---|---|
| 3,004,336 | 10/1961 | Timuska | 29/402.18 |
| 3,039,182 | 6/1962 | Harman | 29/402.18 |
| 3,103,066 | 9/1963 | Harman | 228/119 |
| 4,454,977 | 6/1984 | Aldinger et al. | 228/243 |
| 4,787,549 | 11/1988 | Matay et al. | 228/119 |
| 4,896,814 | 1/1990 | Allain et al. | 29/402.13 |

FOREIGN PATENT DOCUMENTS

| | | | |
|---|---|---|---|
| 55-100891 | 8/1980 | Japan | 228/263.15 |
| 57-56192 | 4/1982 | Japan | 228/119 |
| 57-195591 | 12/1982 | Japan | 228/237 |
| 62-207597 | 9/1987 | Japan | 228/171 |
| 204455 | 10/1923 | United Kingdom | 228/119 |

Primary Examiner—Richard K. Seidel
Assistant Examiner—Jeanne M. Elpel
Attorney, Agent, or Firm—Flehr, Hohbach, Test, Albritton & Herbert

[57] ABSTRACT

A method for repairing drive shafts such that the corrosion stress cracking resistance is increased. More specifically, the drive shaft is removed from the facility in which it is being utilized. After removal, the region of the shaft experiencing cracking is identified and machined to produce a groove having a flat bottom and outwardly tapered edges. Filler material to restore all material removed by machining and provide some excess material is placed in the groove and HIP bonded to the shaft. The excess material is removed from the surface of the shaft to restore the shaft to its original dimension. Due to the filler material having a lower coefficient of thermal expansion than the shaft the repair area is subject to compressive surface stresses.

7 Claims, 5 Drawing Sheets

HOT ISOSTATIC BONDING PROCESS FOR REPAIRING SHAFTS

BACKGROUND OF THE INVENTION

1. Field of the Invention

The invention comprises a method for repairing cracked shafts and more particularly a method for repairing cracked shafts using hot isostatic bonding (HIP) processes.

2. Summary of Prior Art

Coupling or drive shafts are common components used in many systems. In one specialized application specifically in boiling water nuclear reactors, main cooling water pumps are coupled to a drive motor by a stainless steel pump drive shaft. Portions of the drive shaft are exposed to cooling water, creating longitudinal temperature gradient along the shaft. This temperature gradient in conjunction with the exposure to the cooling water promotes thermal fatigue and stress corrosion cracking.

Additionally, these drive shafts typically have other apparatus such as balancing mechanisms attached permanently thereto. Such drive shafts are extremely expensive, shafts typically costing multi-million dollars to replace including labor and replacement components. Economic considerations have caused considerable effort to be devoted to the development of a suitable method of repairing such shafts.

Typically, when inspections reveal that thermal or corrosion stress cracking is occurring, attempts are made to machine the surface of the shaft to remove the cracked portions, thus eliminating or reducing further cracking. This process caused the repaired shaft to have a smaller diameter in the region of the crack. Additionally, the repaired shaft would again be subject to the same deterioration as the original shaft when reinstalled in the equipment. These characteristics have led to a need for a repair process which does not change the dimensions of the shaft. If possible, it is also desirable that the repair process reduce the tendency toward thermal and stress corrosion cracking.

SUMMARY OF THE INVENTION

The claimed invention comprises a method for repairing drive shafts, particularly of those used in the above-discussed applications. The disclosed process is particularly advantageous in that it totally removes the cracked portion of the drive shaft and produces a new surface having dimensions identical to the original drive shaft. Alternatively, the disclosed process permits the susceptibility of the shaft to thermal and corrosion cracking to be reduced.

More specifically in practicing the claimed process, the drive shaft is removed from the facility in which it is being utilized. After removal, the region of the shaft experiencing cracking is identified and machined to produce a groove having a flat bottom and outwardly tapered edges. Suitable material to restore all material removed by machining and provide some excess material is placed in the groove and HIP bonded to the shaft. After HIP bonding, the restored shaft is free of detectable defects. The excess material is removed from the surface of the shaft to restore the shaft to its original dimensions.

In addition to providing a shaft having dimensions identical with the original, the replacement material may be selected such that the cooling process places the replacement material in compression. It is well known that such stresses can improve both the thermal stress and corrosion cracking characteristics of the material.

The invention was primarily developed as a repair process. However, the process may be used as a manufacturing process to produce a shaft having superior thermal stress and corrosion stress cracking characteristics.

DETAILED DESCRIPTION

Figure 1:
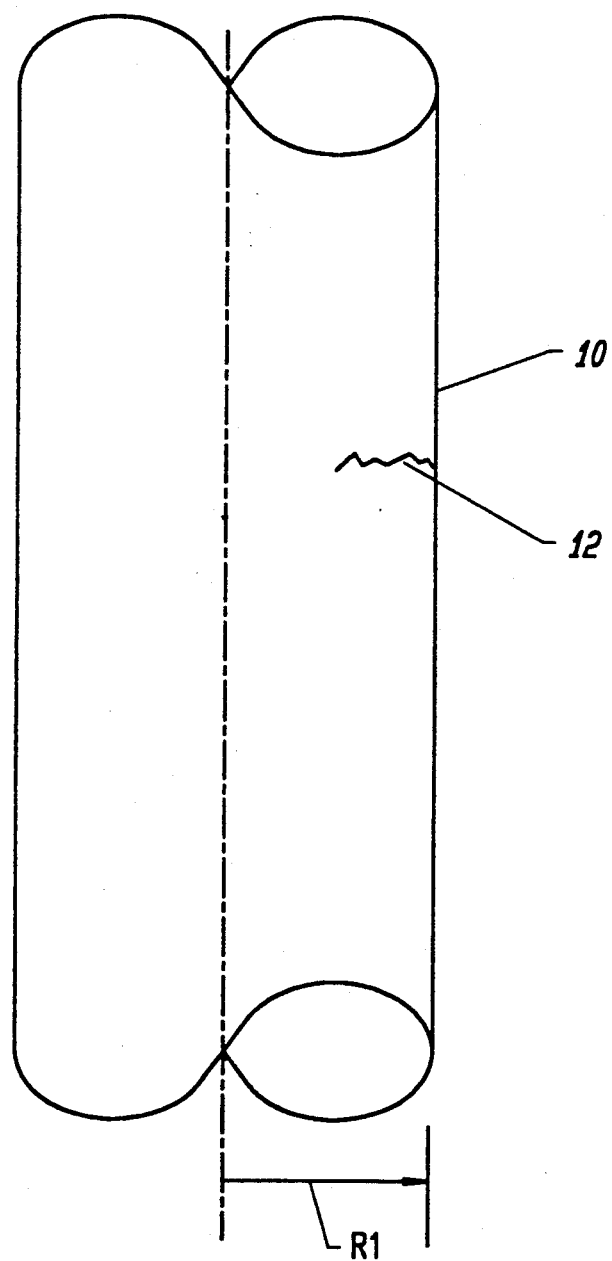
FIG. 1 is a diagram illustrating a typical crack in a shaft.

FIG. 1 is a section of a typical shaft 10 having a crack 12 therein which may have developed from either thermal stress cycling or stress corrosion cracking or a combination thereof. Cracks of this type develop in many components used in rotating machinery. The seriousness of the cracking depends upon the application of the equipment plus the cost of repairing or replacing the shaft.

In the case of drive shafts for main cooling pumps in nuclear reactors, a typical shaft is made of stainless steel, has a radius R1 in the range of 5 inches and may include other equipment such as balancers permanently attached thereto. Due to the critical nature of these applications, the shaft is subject to exacting manufacturing requirements with a typical replacement shaft costing in the range of a million dollars.

Due to the high cost and the critical nature of these applications, it is absolutely required that detected stress cracking be corrected at the earliest time and it is desirable that the correction be accomplished at a low cost. Prior art efforts to correct this type of cracking consisted of machining the shaft to remove the crack. Such a repair procedure has several disadvantages. First the critical configuration of the shaft is changed by the amount of material removed. Since the depth of the crack is unpredictable, this repair leads to a situation in which different shafts have different sizes and characteristics. Additionally, this technique is no longer recommended for repair of cooling pump shafts since it is only a temporary repair and further cracking will occur. Prior to the current invention, there was no suitable alternate method for repairing these shafts.

Figure 2:
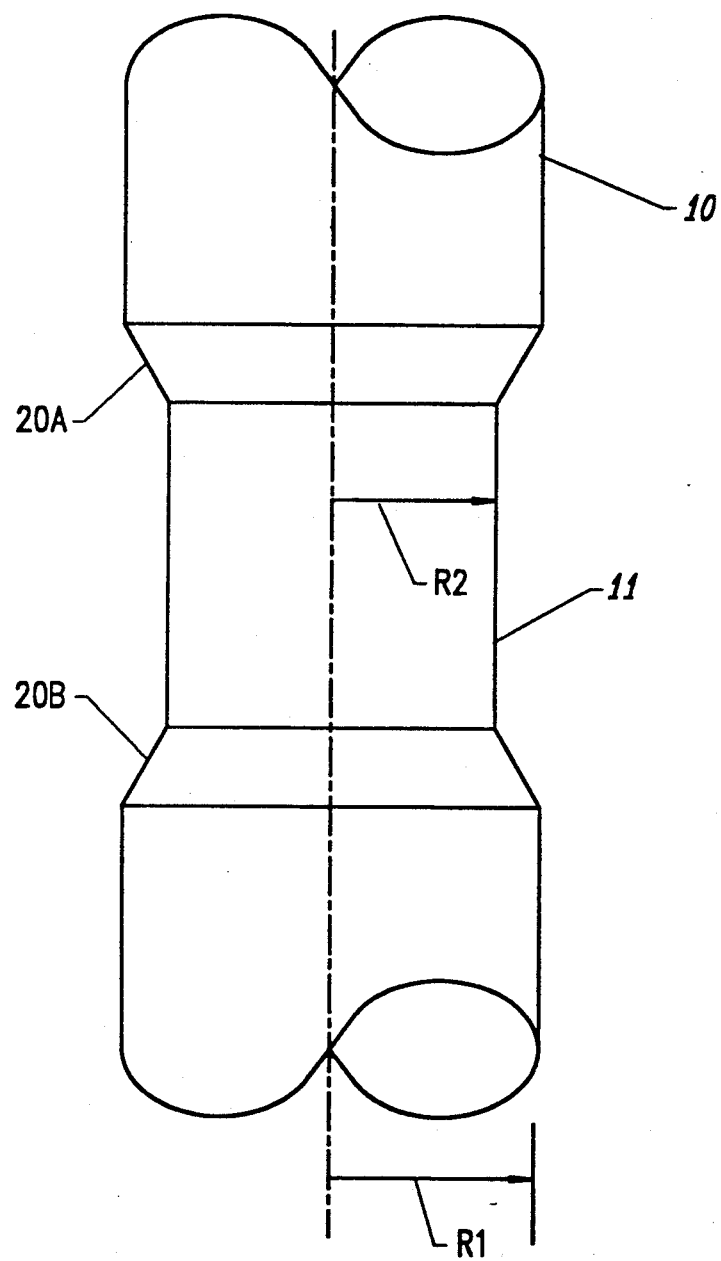
FIG. 2 is a drawing illustrating the removal of the typical crack by machining.

FIG. 2 is a drawing illustrating a typical shaft after the cracked portion has been machined away to form an elongated groove with outwardly sloping sides and a radius R2 as generally indicated at Reference Numeral 14.

Figure 3:
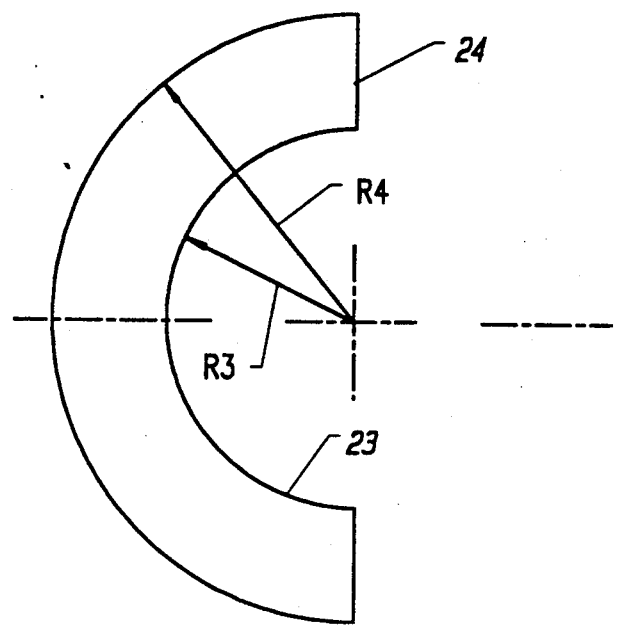
FIG. 3 and FIG. 4 respectively illustrate the end and cross sectional view of the insert.
Figure 4:
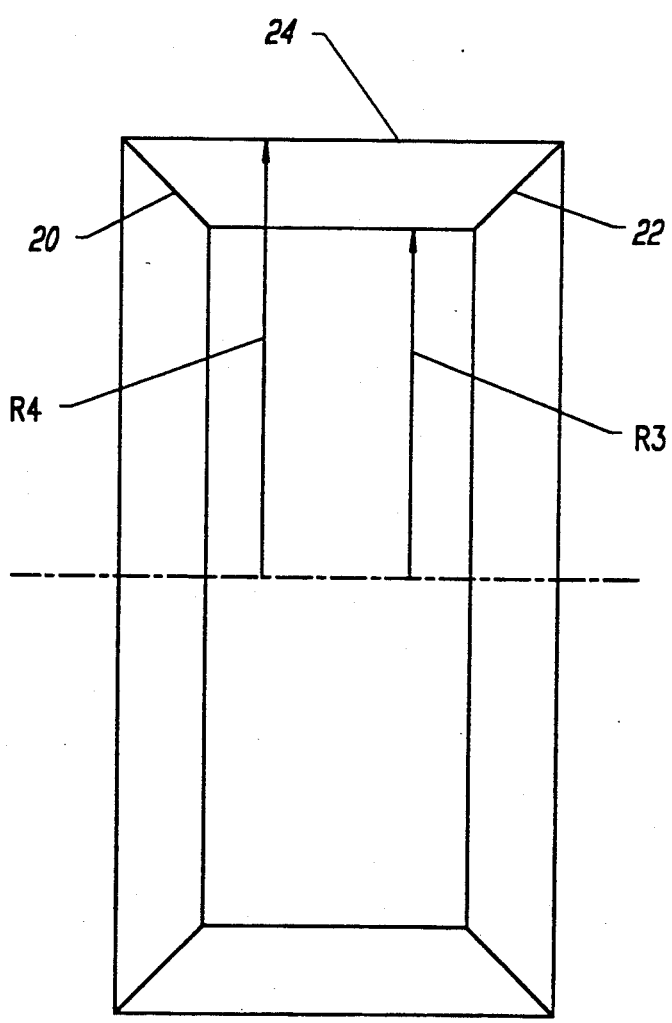

In repairing the shaft 10 in accordance with the process which is the subject matter of this application, the shaft 10 is first machined as illustrated in FIG. 2 The groove 14 is filled with filler material preferably in the form of two substantially identical insert members with one of the members typically illustrated in cross-section in FIG. 3 and in front view in FIG. 4. Suitable inserts may be formed by machining solid metal. Alternatively, a suitable quantity of powdered material may be used to form the insert. In the case of repairing a shaft as discussed above, it is contemplated that the preferred filler material will be stainless steel and the insert formed by machining solid metal.

More specifically, in the preferred embodiment of the invention the inner surface 23 of the insert 24 has an inner radius R3 which is substantially identical to the outer radius R2 of the groove 14. Outer diameter R4 of the insert is slightly larger than the outer diameter of the shaft 10. Additionally, both radial edges 20 and 22 of the insert 24 are sloped with these edges mating with the sloped edges, 20B and 22A of the groove.

Figure 5:
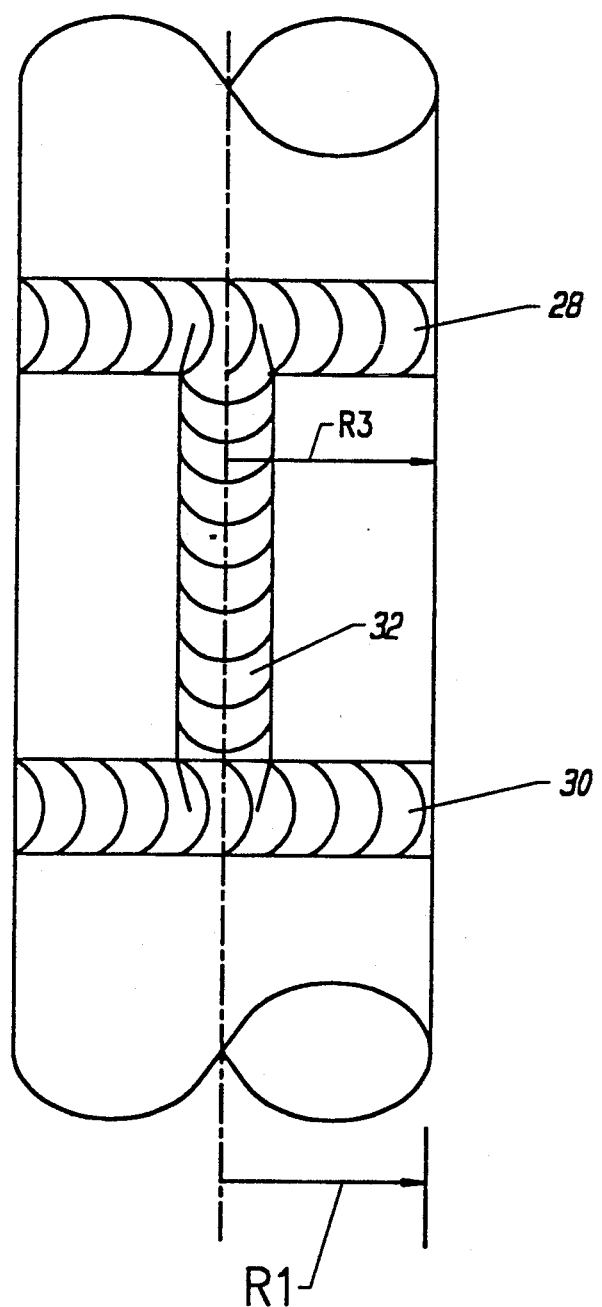
FIG. 5 is a view of the shaft after the insert has been installed and seal welded.

More specifically, the two identical portions of the insert are positioned around the shaft 10 and welded along the radial edges of the insert, as indicated generally at Reference Numerals 28 and 30 of FIG. 5.

Adjacent longitudinal edges of the two members comprising the insert are similarly welded as typically illustrated at Reference Numeral 32. These welding operations seal the junction of the insert with the shaft 10.

In HIP bonding processes, such welds are typically referred to as "seal welds". Following seal welding the outer radius R3 of the portion of the shaft formed by the insert is slightly larger than the radius R1 of the shaft.

Figure 6:
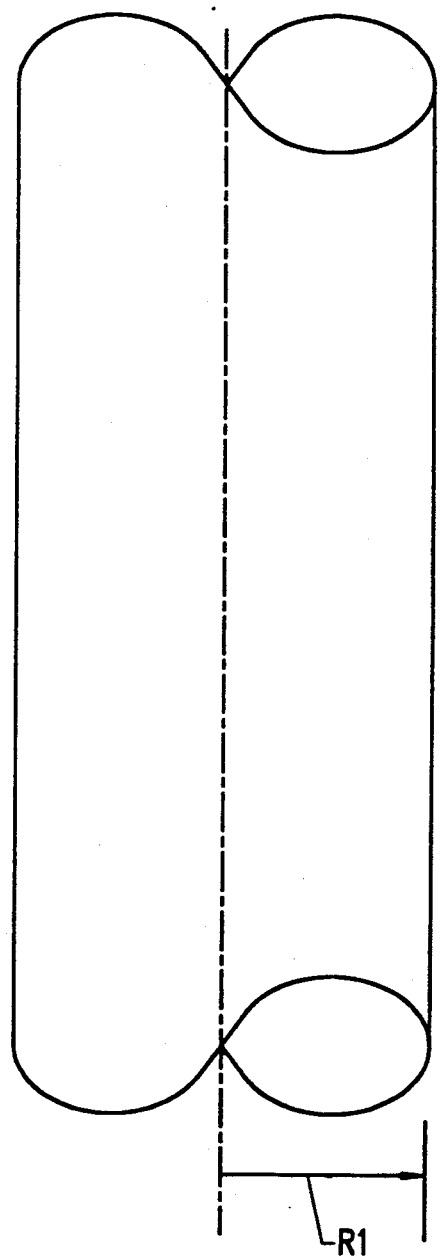
FIG. 6 is a drawing of the shaft after the insert has been HIP bonded and the shaft machined.

Following seal welding as illustrated in FIG. 5, the shaft is subjected to a HIP bonding cycle which causes the insert to fuse to the bottom and to the sloping edges of the groove. Following HIP bonding, the portion of the shaft formed by the insert is machined to the original radius R1 of the shaft as illustrated in FIG. 6. This restores the shaft to its original dimensions and specifications.

If the insert is formed of powdered metal, well known prior art techniques may be used to process suitable quantities of powdered metal to form an insert. Additionally, well known HIP bonding techniques may be used to fuse the powdered metal to form a defect free insert and to bond the insert to the shaft 10. Techniques other than seal welding, may be used to seal the junction of the insert and the shaft.

In selecting the material for the insert members, several characteristics are important. First, it is possible to select material of the type which the shaft was originally made. In such a case, the shaft will be restored precisely to its original dimensions and specifications. This is possible because the shaft can be HIP bonded at a temperature which does not alter its metallurgical properties.

Alternatively, the material for the insert member can be selected to have a slightly lower expansion coefficient than the shaft, in which case the differential expansions during cooling will cause the insert members to be placed in compression.

As is well known, placing certain materials, such as various grades of stainless steel, in compression can significantly improve their corrosion resistance and resistance to thermal fatigue. Using this technique, the corrosion resistance of the surface can be improved without substantially changing the mechanical properties of the shaft. This is possible because only a small portion of material will be removed in the repair process with the bulk portion of the shaft determining the physical properties of the shaft.

In the case of stainless steel shafts, the body of the shaft may be made of a first type of stainless steel and the insert of a second type with the types selected to achieve the desired level of stress in the finished shaft.

It will be obvious to those skilled in the art that the above process can also be used in manufacturing a shaft having superior thermal stress and corrosive stress cracking characteristics. Additionally, this process could be used to add material to a shaft, permitting improvements in design to be incorporated into existing components.

I claim:

1. A method for repairing a shaft which includes an outer surface, and at least a portion degraded by a defect in said shaft, said defect having a predetermined relationship to said outer surface; to restore the mechanical properties of said shaft, to improve the resistance of said shaft to corrosion stress cracking, and to improve the resistance of said shaft to thermal stress cracking, said method including the steps of:
   a) machining said shaft to remove a selected portion of said shaft, said selected portion extending from said outer surface of said shaft a predetermined distance therein, said predetermined distance being selected such that said portion degraded by a defect is removed from said shaft;
   b) positioning selected filler material in said groove, said filler material having a coefficient of thermal expansion less than the coefficient of thermal expansion of said shaft;
   c) utilizing a hot isostatic bonding process to form a metallurgical bond between sad filler material and said shaft, such that after said hot isostatic bonding process is completed, said filler material is placed in compression by said shaft to cause said shaft to have increased resistance to thermal stress cracking and to corrosion stress cracking in a selected region along the outer surface of said shaft.

2. A method for repairing a shaft in accordance with claim 1 including the further step of machining the outer surface of said shaft to restore the diameter of said shaft to a desired value.

3. A method for repairing a shaft in accordance with claim 2 wherein said shaft is composed of stainless steel of a first type.

4. A method for repairing a shaft in accordance with claim 3 wherein said filler material is composed of stainless steel of a second type.

5. A method of manufacturing a shaft which includes a main body and a selected region having higher resistance to corrosion stress cracking and to thermal stress cracking than the remainder of said shaft, the method including the steps of:
   (a) machining said main body of said shaft to produce a cylindrical body containing a groove positioned between opposed ends of said shaft;
   (b) positioning selected filler material in said groove, said filler material having a coefficient of thermal expansion less than the coefficient of thermal expansion of said main body of said shaft; and
   (c) utilizing a hot isostatic bonding process to form a metallurgical bond between said filler material and said main body of said shaft, such that after said hot isostatic bonding process is completed, said filler material is placed in compression by said shaft to produce a shaft having a resistance to thermal stress cracking and to corrosion stress cracking in a selected region corresponding to at least a portion of said shaft which is formed of said filler material which is higher than the resistance of other portions of said shaft to corrosion stress cracking and to thermal stress cracking.

6. A method of manufacturing a shaft in accordance with claim 5 wherein said shaft is composed of stainless steel of a first type.

7. A method of manufacturing a shaft in accordance with claim 6 wherein aid filler material is composed of stainless steel of a second type.

* * * * *